(12) United States Patent
Kanamitsu

(10) Patent No.: US 11,810,580 B2
(45) Date of Patent: Nov. 7, 2023

(54) COMMUNICATION TRANSMISSION DEVICE, METHOD OF VOICE FAULT DETECTION, AND PROGRAM

(71) Applicant: Nippon Telegraph and Telephone Corporation, Tokyo (JP)

(72) Inventor: Takuo Kanamitsu, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/802,225

(22) PCT Filed: Feb. 28, 2020

(86) PCT No.: PCT/JP2020/008269
§ 371 (c)(1),
(2) Date: Aug. 25, 2022

(87) PCT Pub. No.: WO2021/171547
PCT Pub. Date: Sep. 2, 2021

(65) Prior Publication Data
US 2023/0083378 A1    Mar. 16, 2023

(51) Int. Cl.
*G10L 19/00* (2013.01)
*G10L 21/0208* (2013.01)
(Continued)

(52) U.S. Cl.
CPC .......... *G10L 19/00* (2013.01); *G10L 21/0208* (2013.01); *G10L 25/69* (2013.01); *H04M 1/24* (2013.01)

(58) Field of Classification Search
CPC ..... G10L 19/00; G10L 21/0208; G10L 25/69; H04M 1/24
See application file for complete search history.

(56) References Cited

U.S. PATENT DOCUMENTS

2007/0225839 A1* 9/2007 Nagaoka ................ H03G 3/344
700/94
2011/0261869 A1* 10/2011 Suwa .................... G10L 19/005
375/259

(Continued)

FOREIGN PATENT DOCUMENTS

CN        112119455 A  * 12/2020  ............... G06F 3/16
JP       2005100159 A  *  4/2005  ............... G06F 7/00
(Continued)

*Primary Examiner* — Mohammad K Islam
(74) *Attorney, Agent, or Firm* — Fish & Richardson P.C.

(57) ABSTRACT

A communication transmission device is provided with an input sound level detection unit for dividing, per unit time, sound data of a predetermined period of time and converting the sound data into a bit string according to whether or not a sound level thereof exceeds a predetermined threshold value, an arithmetic processing unit for performing predetermined arithmetic processing on the sound data an output sound level detection unit for dividing, per the unit time, sound data of the predetermined period of time after the arithmetic processing and converting the sound data into a bit string according to whether or not a sound level thereof exceeds the predetermined threshold value, and a comparison determination unit for determining whether or not a sound failure has occurred on the basis of a predetermined logic by which the bit string before the arithmetic processing and the bit string after the arithmetic processing are compared.

7 Claims, 7 Drawing Sheets

(51) Int. Cl.
  *G10L 25/69* (2013.01)
  *H04M 1/24* (2006.01)

(56) References Cited

U.S. PATENT DOCUMENTS

| | | | |
|---|---|---|---|
| 2020/0037928 A1 | 2/2020 | Edwards et al. | |
| 2020/0372928 A1 | 11/2020 | Kanamitsu | |

FOREIGN PATENT DOCUMENTS

| | | | | | |
|---|---|---|---|---|---|
| JP | 2011176842 | A | * | 9/2011 | ............... H04B 1/10 |
| JP | 2012026870 | A | * | 2/2012 | ................ G01H 3/00 |
| JP | 2013106707 | A | * | 6/2013 | ............... A61B 5/08 |
| JP | 2014204318 | A | * | 10/2014 | ............. H04M 1/00 |
| JP | 2018190018 | A | * | 11/2018 | ............ G08B 29/12 |
| JP | WO2020004609 | A1 | * | 6/2019 | ............ G01S 15/32 |
| JP | 2019145874 | | | 8/2019 | |
| JP | 2020120243 | A | * | 8/2020 | ........... H04R 29/001 |

* cited by examiner

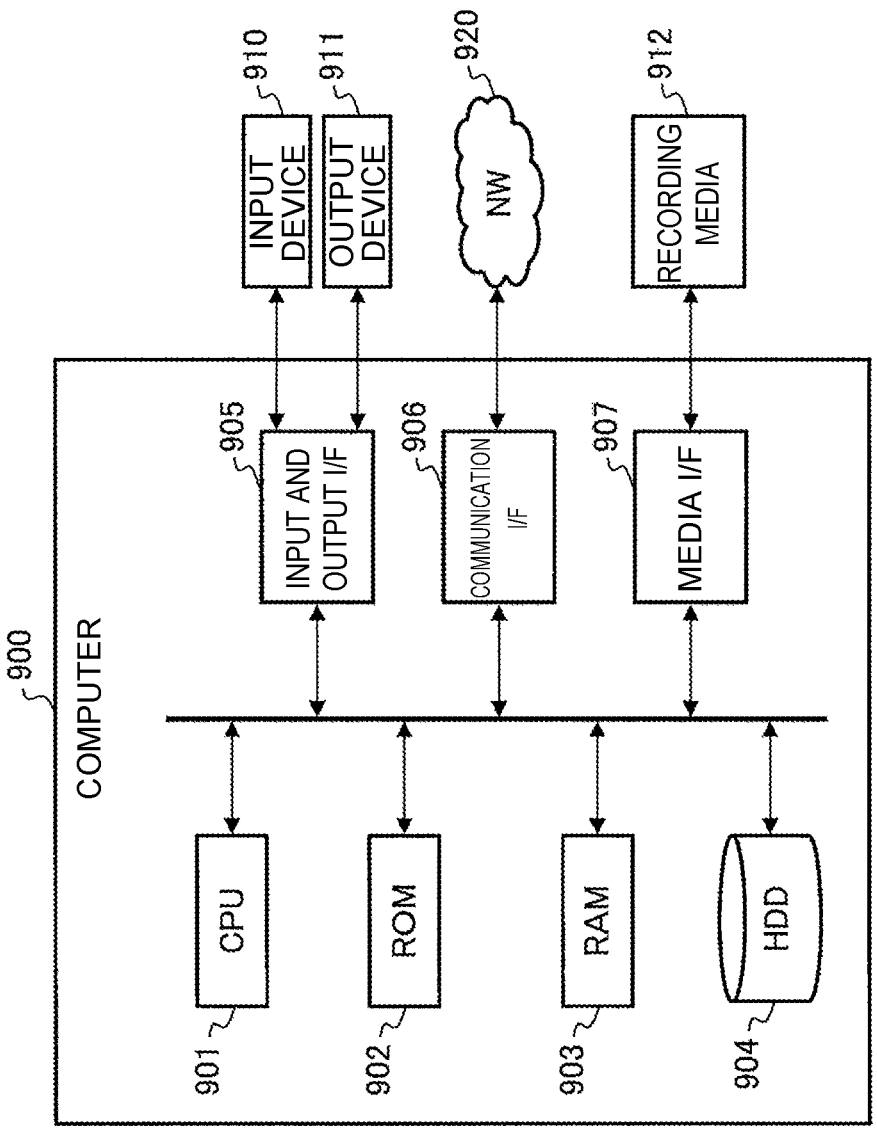

COMMUNICATION TRANSMISSION DEVICE, METHOD OF VOICE FAULT DETECTION, AND PROGRAM

CROSS-REFERENCE TO RELATED APPLICATIONS

This application is a National Stage application under 35 U.S.C. § 371 of International Application No. PCT/JP2020/008269, having an International Filing Date of Feb. 28, 2020, the disclosure of which is considered part of the disclosure of this application, and is incorporated by reference in its entirety into this application.

TECHNICAL FIELD

The present invention relates to a communication transmission device that performs digital processing on a sound signal, a sound failure detection method of the communication transmission device, and a program thereof.

BACKGROUND ART

In a communication transmission device for communication of a sound signal (sound data), it is a common practice to perform digital arithmetic processing to execute codec conversion processing for converting the sound signal into data of predetermined specifications, echo cancel processing for cancelling an echo component, or the like (for example, see Patent Literature 1).

In the codec conversion processing, a sound signal in one codec format is converted into a sound signal in another communicable codec format. In the echo cancel processing, an echo, which is generated when a sound coming out of a speaker of a telephone set is picked up with a microphone, is removed.

CITATION LIST

Patent Literature

Patent Literature 1: Japanese Patent Laid-Open No. 2019-145874

SUMMARY OF THE INVENTION

Technical Problem

In the communication transmission device that performs the above digital processing, when the arithmetic processing such as the codec conversion processing, the echo cancel processing, or the like is performed on the sound signal, data consistency before and after the processing may in some cases not be guaranteed. However, even when the sound signals differ before and after the arithmetic processing due to an error of the arithmetic processing of the communication transmission device, it does not necessarily mean that a sound failure, which makes a sound difficult to be heard with human ears, has occurred. Therefore, it is difficult to determine whether the sound failure has occurred by simply comparing the digitized sound signals.

An object of the present invention, which has been made in consideration of such a point, is to appropriately determine the sound failure after the arithmetic processing on the sound signal such as the codec conversion processing, the echo cancel processing, or the like.

Means for Solving the Problem

A communication transmission device according to the present invention is a communication transmission device for transmitting sound data, which includes an input sound level detection unit configured to divide, per unit time, input sound data of a predetermined period of time and to convert the sound data into a bit string represented by a bit value of 0 or 1 according to whether or not a sound level of the sound data per the unit time exceeds a predetermined threshold value, an arithmetic processing unit configured to perform predetermined arithmetic processing on the sound data, an output sound level detection unit configured to divide, per the unit time, the sound data of the predetermined period of time after the arithmetic processing, which is output by the arithmetic processing unit, and to convert the sound data into a bit string represented by a bit value of 0 or 1 according to whether or not a sound level of the sound data per the unit time exceeds the predetermined threshold value, and a comparison determination unit configured to determine whether or not a sound failure has occurred on the basis of a predetermined logic by which the bit string before the arithmetic processing, which has been converted by the input sound level detection unit, and the bit string after the arithmetic processing, which has been converted by the output sound level detection unit, are compared.

Effects of the Invention

According to the present invention, it is possible to appropriately determine a sound failure after arithmetic processing on a sound signal such as codec conversion processing, echo cancel processing, or the like.

BRIEF DESCRIPTION OF DRAWINGS

FIG. 7 is a hardware configuration diagram showing an example of a computer that implements a function of the communication transmission device according to the present embodiments.

DESCRIPTION OF EMBODIMENTS

Next, embodiments for implementing the present invention (hereinafter, referred to as "the present embodiments") will be described.

A communication transmission device 1 (1A, 1B) according to the present embodiments (see FIG. 1 and FIG. 4 that will be described later) does not compare digitized sound data itself but detects magnitudes of sound levels of the sound data before and after arithmetic processing and converts the sound data into bit strings. Then, the communication transmission device 1 detects a sound failure such as switching over between channels, a noise, or the like due to an error of the arithmetic processing by comparing the bit strings before and after the arithmetic processing based on a predetermined logic.

Hereinafter, in a first embodiment, an example will be described in which the communication transmission device 1 (1A) detects an occurrence of a sound failure by converting sound levels of sound data into bit strings before and after arithmetic processing and then by comparing change patterns of the bit strings. Further, in a second embodiment, an example will be described in which the communication transmission device 1 (1B) detects an occurrence of a sound failure by comparing change timings of respective bits into which the sound levels have been converted before and after the arithmetic processing.

First Embodiment

Figure 1:
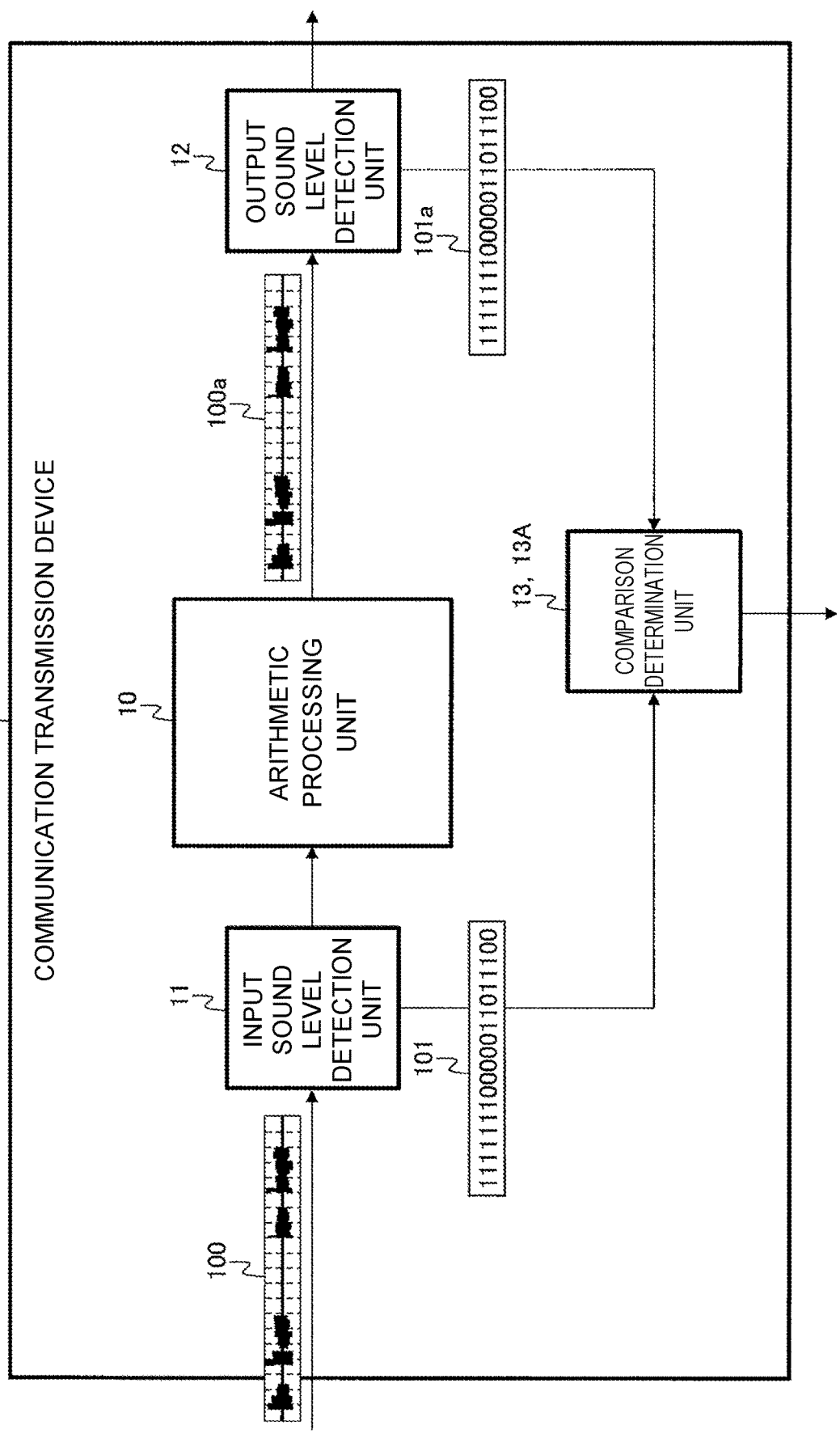
FIG. 1 is a block diagram showing a configuration of a communication transmission device according to a first embodiment of the present invention.

FIG. 1 is a block diagram showing a configuration of the communication transmission device 1 (1A) according to the first embodiment of the present invention.

The present communication transmission device 1 (1A) is configured with a computer including a control unit, an input and output unit, and a memory unit (illustrations of all of which are omitted) (the details will be described below). Further, as shown in FIG. 1, the control unit includes an arithmetic processing unit 10, an input sound level detection unit 11, an output sound level detection unit 12, and a comparison determination unit 13 (13A).

The arithmetic processing unit 10 performs predetermined arithmetic processing, for example, codec conversion processing, echo cancel processing, or the like, to input sound data.

The input sound level detection unit 11 divides sound data 100 of a predetermined period of time, which has been input into the communication transmission device 1 by a terminal (for example, an IP telephone set) or the like, per unit time that serves as a determination cycle of a sound level, and determines a magnitude of the sound level per the unit time according to whether a predetermined threshold value is exceeded. Then, the input sound level detection unit 11 converts a determination result into a bit string 101. Specifically, when the sound level exceeds the predetermined threshold value, the input sound level detection unit 11 sets a bit value "1", and when the sound level is the predetermined threshold value or lower, the input sound level detection unit 11 sets a bit value "0". In this manner, the input sound level detection unit 11 converts the determination result into the bit string 101 by determining the sound level per the unit time.

The input sound level detection unit 11 outputs the received sound data 100 as it is to the arithmetic processing unit 10. Then, the input sound level detection unit 11 outputs the converted bit string 101 to the comparison determination unit 13 (13A).

When the output sound level detection unit 12 receives sound data 100a (after the arithmetic processing) that is output from the arithmetic processing unit 10, in a similar manner as the input sound level detection unit 11, the output sound level detection unit 12 divides the sound data 100a, which has been received during a predetermined period of time, per the unit time that serves as the determination cycle of the sound level, and determines a magnitude of the sound level per the unit time according to whether or not the predetermined threshold value is exceeded. Then, the output sound level detection unit 12 converts a determination result into a bit string 101a. Specifically, when the sound level exceeds the predetermined threshold value, the output sound level detection unit 12 sets a bit value "1", and when the sound level is the predetermined threshold value or lower, the output sound level detection unit 12 sets a bit value "0". In this manner, the output sound level detection unit 12 converts the determination result into the bit string 101a by determining the sound level per the unit time.

The output sound level detection unit 12 outputs the received sound data 100a as it is to a terminal (for example, an IP telephone set or the like) that is a communication destination. Then, the output sound level detection unit 12 outputs the converted bit string 101a to the comparison determination unit 13 (13A).

The comparison determination unit 13 (13A) performs a determination whether a sound failure has occurred based on a predetermined logic by which the bit strings before and after the arithmetic processing in the arithmetic processing unit 10 are compared.

Specifically, when the comparison determination unit 13A acquires the bit string 101 from the input sound level detection unit 11 and acquires the bit string 101a from the output sound level detection unit 12, the comparison determination unit 13A sets a time difference in the first bit changes in the respective bit strings as a fixed delay. This is to compensate an impact of a processing delay in the arithmetic processing unit 10. The comparison determination unit 13A determines the sound failure by comparing the change patterns of the bit strings (sound levels) between the bit string 101 before the arithmetic processing acquired from the input sound level detection unit 11 and the bit string 101a after the arithmetic processing acquired from the output sound level detection unit 12.

Figure 2:
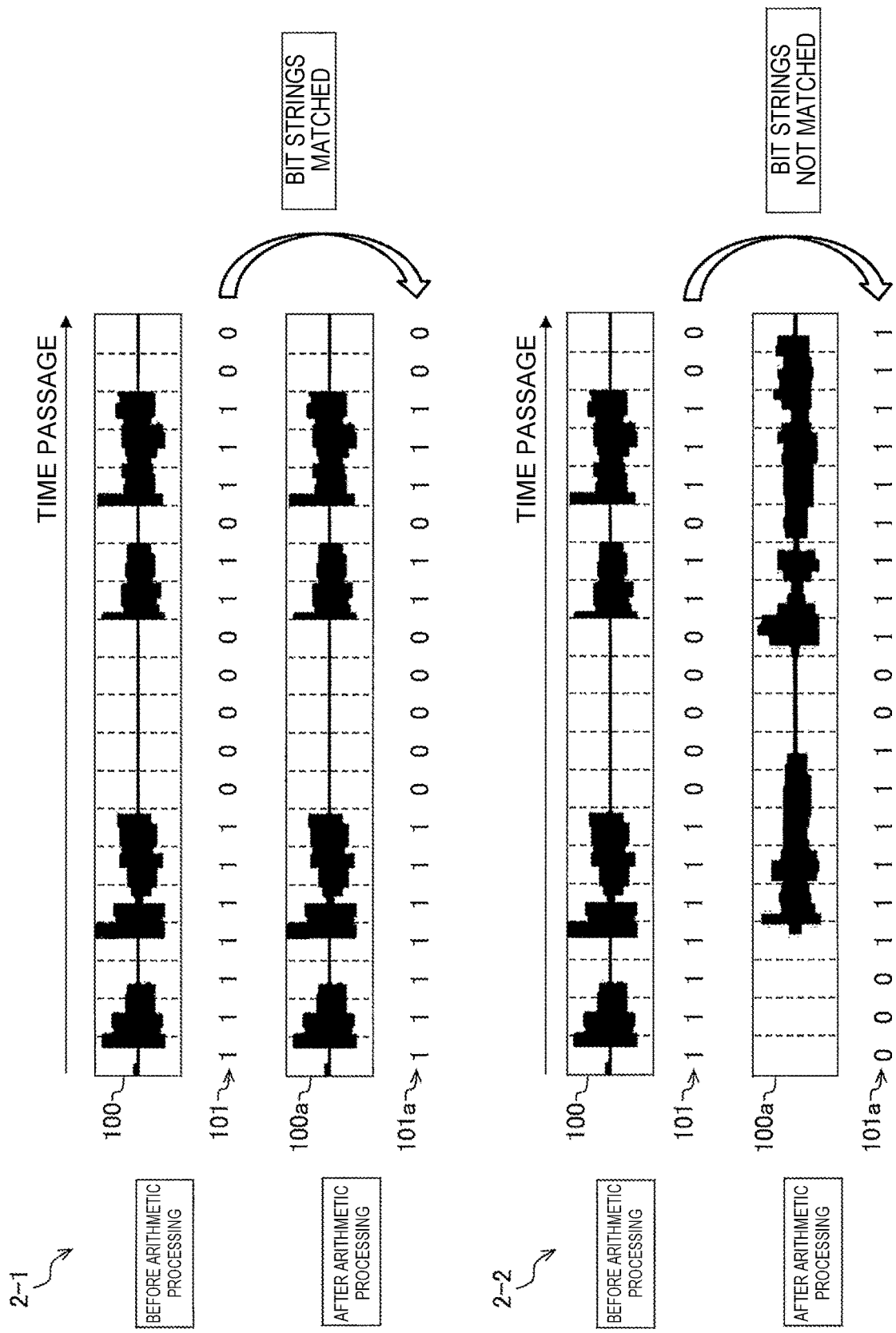
FIG. 2 is a diagram for describing a determination of a sound failure by the communication transmission device according to the first embodiment of the present invention.

FIG. 2 is a diagram for describing the determination of the sound failure by the communication transmission device 1 (1A) according to the first embodiment of the present invention.

A comparative example of the bit strings shown by a reference sign 2-1 is an example in which the bit strings are matched before and after the arithmetic processing and the sound failure has not occurred.

The sound data 100 before the arithmetic processing is converted into the bit string 101 by the input sound level detection unit 11. On the other hand, the sound data 100a after the arithmetic processing is converted into the bit string 101a by the output sound level detection unit 12.

The comparison determination unit 13 (13A) determines that the sound failure has not occurred because the values of the respective bits are matched between the bit string 101 before the arithmetic processing and the bit string 101a after the arithmetic processing, in other words, the change patterns of the sound levels are matched.

A comparative example of the bit strings shown by a reference sign 2-2 is an example in which the bit strings are not matched before and after the arithmetic processing and the sound failure has occurred.

The sound data 100 before the arithmetic processing is converted into the bit string 101 by the input sound level detection unit 11. On the other hand, the sound data 100a after the arithmetic processing is converted into the bit string 101a by the output sound level detection unit 12.

The comparison determination unit 13 (13A) determines that the sound failure has occurred because there are some spots in which the values of the bits are not matched between the bit string 101 before the arithmetic processing and the bit string 101a after the arithmetic processing, in other words, the change patterns of the sound levels are not matched.

When the comparison determination unit 13 (13A) determines that the bit strings before and after the arithmetic processing are not matched and thus a sound failure has occurred, the comparison determination unit 13 (13A) transmits the determination result to this effect to a maintenance terminal (management server) or the like. This allows a person in charge of maintenance to be notified of an occurrence of the sound failure such as switching over between channels, a noise, or the like due to an error of the arithmetic processing, making it possible to prompt an appropriate measure to be taken to maintain the quality of service.

Next, a flow of the processing of the communication transmission device 1 (1A) will be described.

Figure 3:
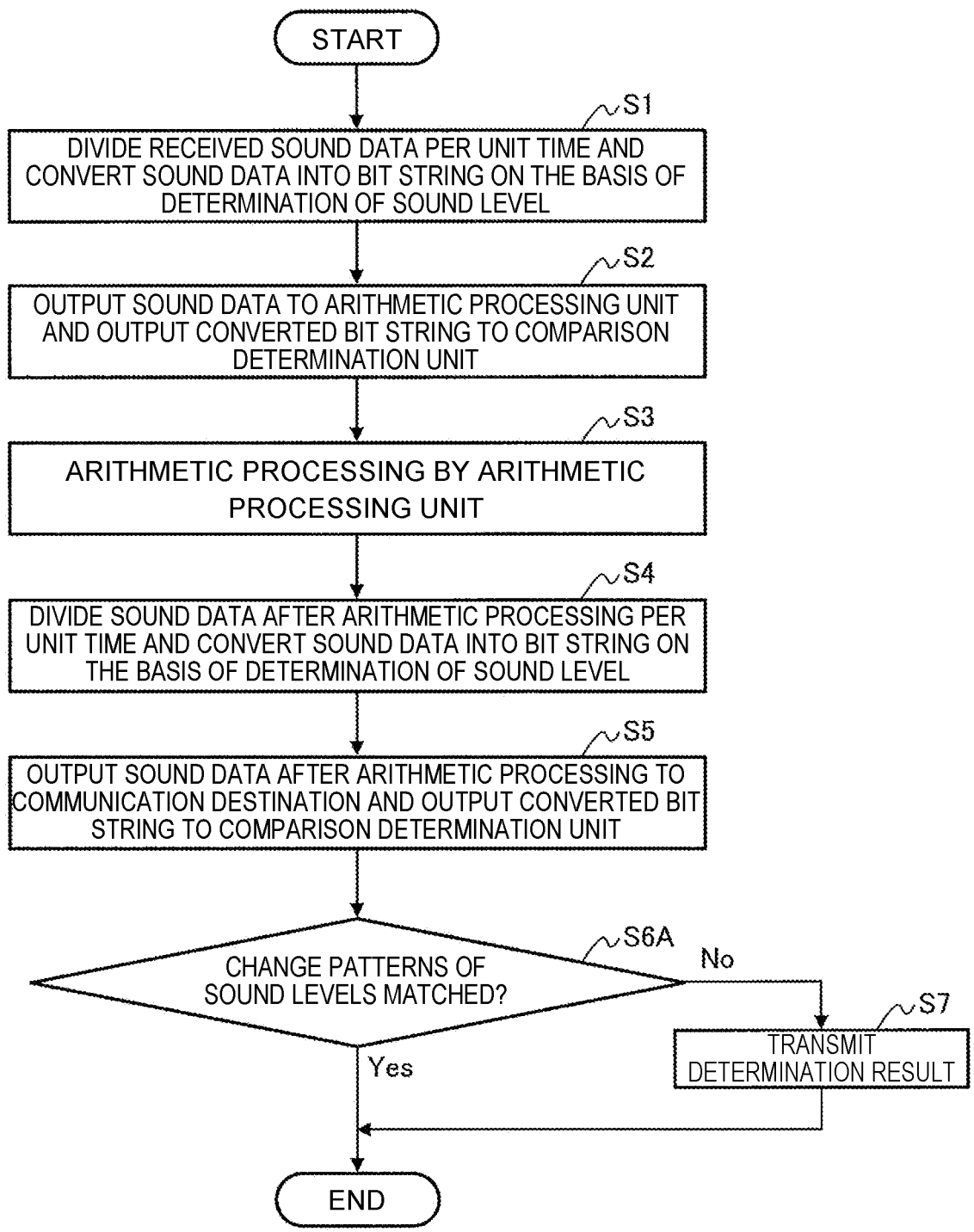
FIG. 3 is a flowchart showing a flow of sound failure detection processing carried out by the communication transmission device according to the first embodiment of the present invention.

FIG. 3 is a flowchart showing a flow of the sound failure detection processing carried out by the communication transmission device 1 (1A) according to the first embodiment of the present invention.

First, in step S1, the input sound level detection unit 11 of the communication transmission device 1 (1A) divides the sound data 100 of a predetermined period of time, which has been input by a terminal (for example, an IP telephone set) or the like, per unit time that serves as a determination cycle of a sound level, and determines a magnitude of the sound level per the unit time according to whether the predetermined threshold value is exceeded. Then, the input sound level detection unit 11 converts the sound data 100 into the bit string 101 by setting the sound level in a bit of 0/1 based on the determination of the magnitude of the sound level.

Then, the input sound level detection unit 11 outputs the received sound data 100 to the arithmetic processing unit 10 and also outputs the converted bit string 101 to the comparison determination unit 13A (step S2).

Subsequently, when the arithmetic processing unit 10 acquires the sound data 100, the arithmetic processing unit 10 performs predetermined arithmetic processing, for example, codec conversion processing, echo cancel processing, or the like (step S3).

Then, the arithmetic processing unit 10 outputs the sound data after the arithmetic processing on the output sound level detection unit 12.

In step S4, when the output sound level detection unit 12 receives the sound data 100a (after the arithmetic processing) that is output from the arithmetic processing unit 10, the output sound level detection unit 12 divides the sound data 100a of the predetermined period of time per the unit time that serves as a determination cycle of the sound level, and determines a magnitude of the sound level per the unit time according to whether or not the predetermined threshold value is exceeded. Then, the output sound level detection unit 12 converts the sound data 100a after the arithmetic processing into the bit string 101a by setting the sound level in a bit of 0/1 based on the determination of the magnitude of the sound level.

Then, the output sound level detection unit 12 outputs the received sound data 100a as it is to a terminal (for example, an IP telephone set or the like) that is the communication destination and also outputs the converted bit string 101a to the comparison determination unit 13A (step S5).

Next, the comparison determination unit 13A compares the bit string 101 before the arithmetic processing acquired from the input sound level detection unit 11 and the bit string 101a after the arithmetic processing acquired from the output sound level detection unit 12, and determines the sound failure according to whether the change patterns of the sound levels indicated by the bit strings are matched (the values of the respective bits are matched) (step S6A).

Then, when the change patterns of the sound levels are matched (the values of the bit string are matched) (Yes in step S6A), the comparison determination unit 13A determines that the sound failure has not occurred and ends the processing. On the other hand, when the change patterns of the sound levels are not matched (the values of the bit strings are not matched) (No in step S6A), the comparison determination unit 13A determines that the sound failure has occurred. Then, the comparison determination unit 13A transmits the determination result to this effect to a maintenance terminal (management server) or the like (step S7) and ends the processing.

Second Embodiment

Next, the second embodiment of the present invention will be described.

Figure 4:
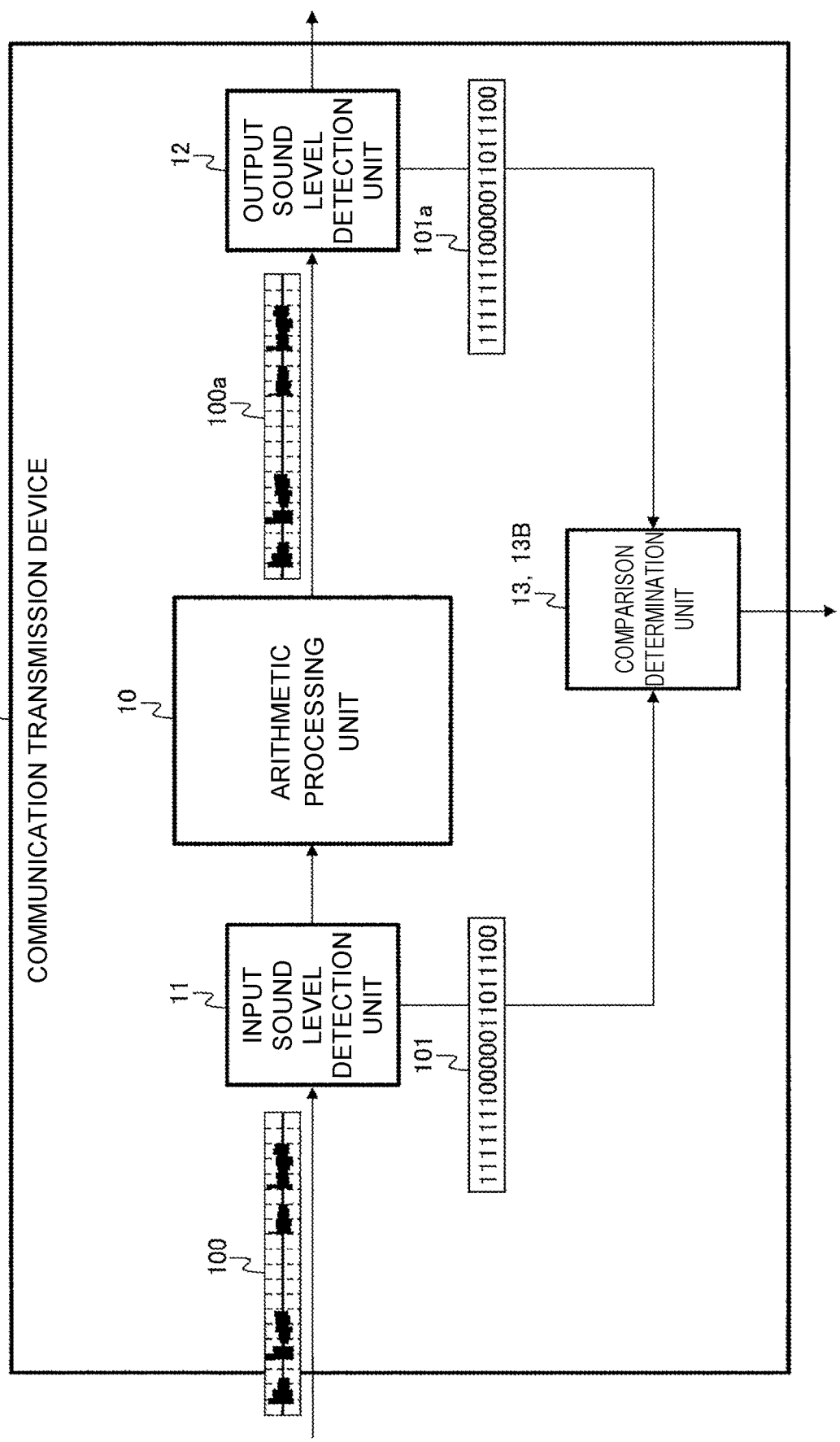
FIG. 4 is a block diagram showing a configuration of a communication transmission device according to a second embodiment of the present invention.

FIG. 4 is a block diagram showing a configuration of the communication transmission device 1 (1B) according to the second embodiment of the present invention.

A difference from the communication transmission device 1 (1A) according to the first embodiment shown in FIG. 1 is that a comparison determination unit 13 (13B) is used in the second embodiment shown in FIG. 4.

It should be noted that, for the same configuration as that shown in FIG. 1, the same name and reference sign are given, and description thereof is omitted.

The comparison determination unit 13 (13B) performs a determination whether a sound failure has occurred based on a predetermined logic by which the bit strings before and after the processing in the arithmetic processing unit 10 are compared.

Specifically, when the comparison determination unit 13B acquires the bit string 101 from the input sound level detection unit 11 and acquires the bit string 101a from the output sound level detection unit 12, the comparison determination unit 13B sets a time difference in the first bit changes in the respective bit strings as a fixed delay. Then, the comparison determination unit 13B determines the sound failure by comparing the change timings of the bits between the bit string 101 before the arithmetic processing acquired from the input sound level detection unit 11 and the bit string 101a after the arithmetic processing acquired from the output sound level detection unit 12. More particularly, the comparison determination unit 13B determines whether the timings of the bit changes 0 to 1 and 1 to 0 are matched in the bit strings before and after the arithmetic processing.

Figure 5:
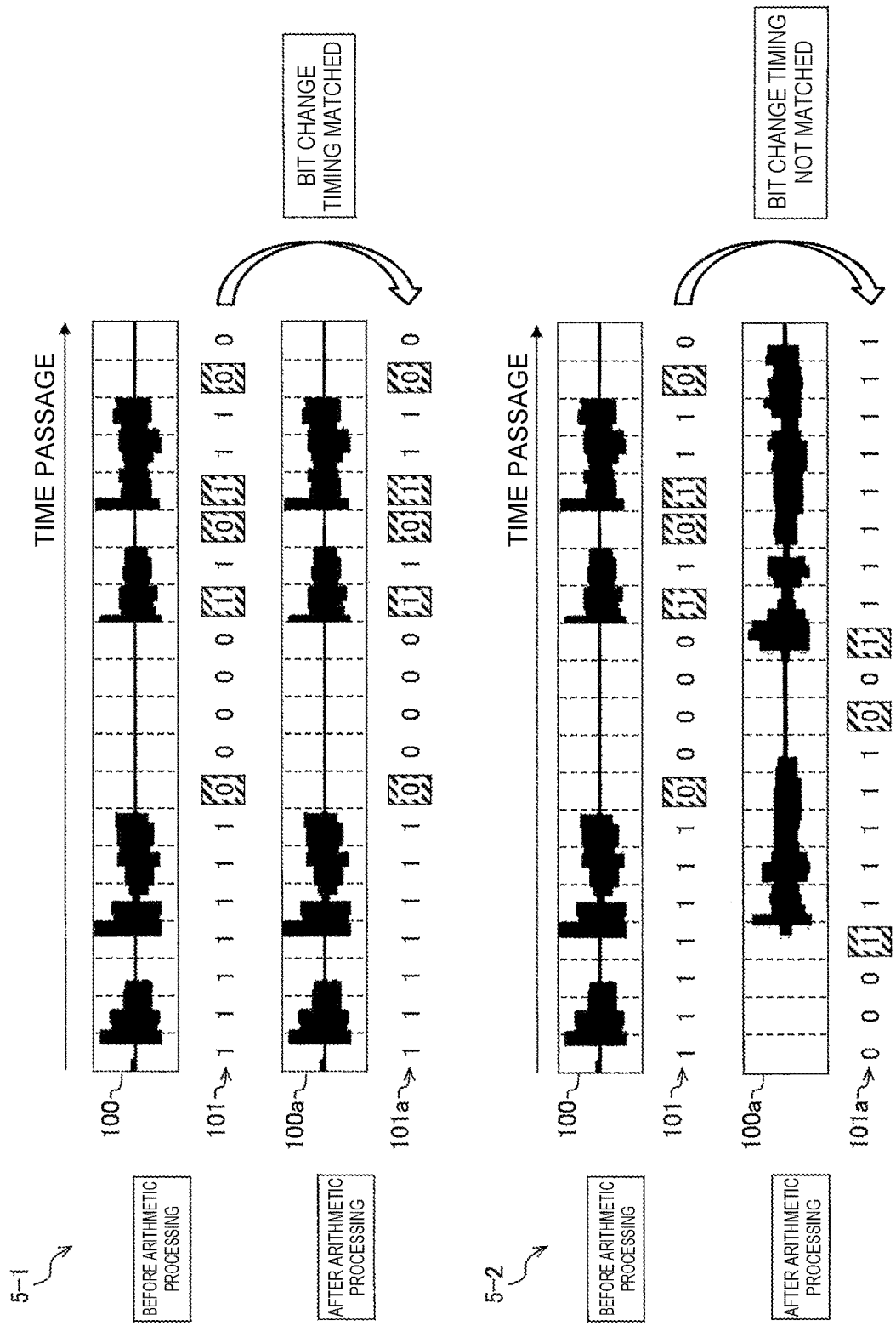
FIG. 5 is a diagram for describing a determination of a sound failure by the communication transmission device according to the second embodiment of the present invention.

FIG. 5 is a diagram for describing the determination of the sound failure by the communication transmission device 1 (1B) according to the second embodiment of the present invention.

A comparative example of the bit strings shown by a reference sign 5-1 is an example in which the timings of the bit changes are matched before and after the arithmetic processing and the sound failure has not occurred.

The sound data 100 before the arithmetic processing is converted into the bit string 101 by the input sound level detection unit 11. On the other hand, the sound data 100a after the arithmetic processing is converted into the bit string 101a by the output sound level detection unit 12.

The comparison determination unit 13 (13B) identifies spots at which the bits have changed (0 to 1, 1 to 0) between the bit string 101 before the arithmetic processing and the bit string 101*a* after the arithmetic processing (the spots at which the bits are surrounded by hatched lines in FIG. 5). Then, the comparison determination unit 13 (13B) determines that the sound failure has not occurred before and after the arithmetic processing because the spots (timings) at which the bits have changed are matched.

A comparative example of the bit strings shown by a reference sign 5-2 is an example in which the timings of the bit changes are not matched before and after the arithmetic processing and the sound failure has occurred.

The sound data 100 before the arithmetic processing is converted into the bit string 101 by the input sound level detection unit 11. On the other hand, the sound data 100*a* after the arithmetic processing is converted into the bit string 101*a* by the output sound level detection unit 12.

The comparison determination unit 13 (13B) identifies spots at which the bits have changed (0 to 1, 1 to 0) between the bit string 101 before the arithmetic processing and the bit string 101*a* after the arithmetic processing (the spots at which the bits are surrounded by hatched lines in FIG. 5). Then, the comparison determination unit 13 (13B) determines that the sound failure has occurred because some spots at which the bits have changed are not matched, in other words, the timings of the bit changes are not matched.

When the comparison determination unit 13 (13B) determines that the timings of the bit changes before and after the arithmetic processing are not matched and thus a sound failure has occurred, the comparison determination unit 13 (13B) transmits the determination result to this effect to a maintenance terminal (management server) or the like. This allows a person in charge of maintenance to be notified of an occurrence of the sound failure such as switching over between channels, a noise, or the like due to an error of the arithmetic processing, making it possible to prompt an appropriate measure to be taken to maintain the quality of service.

Next, a flow of the processing of the communication transmission device 1 (1B) will be described.

Figure 6:
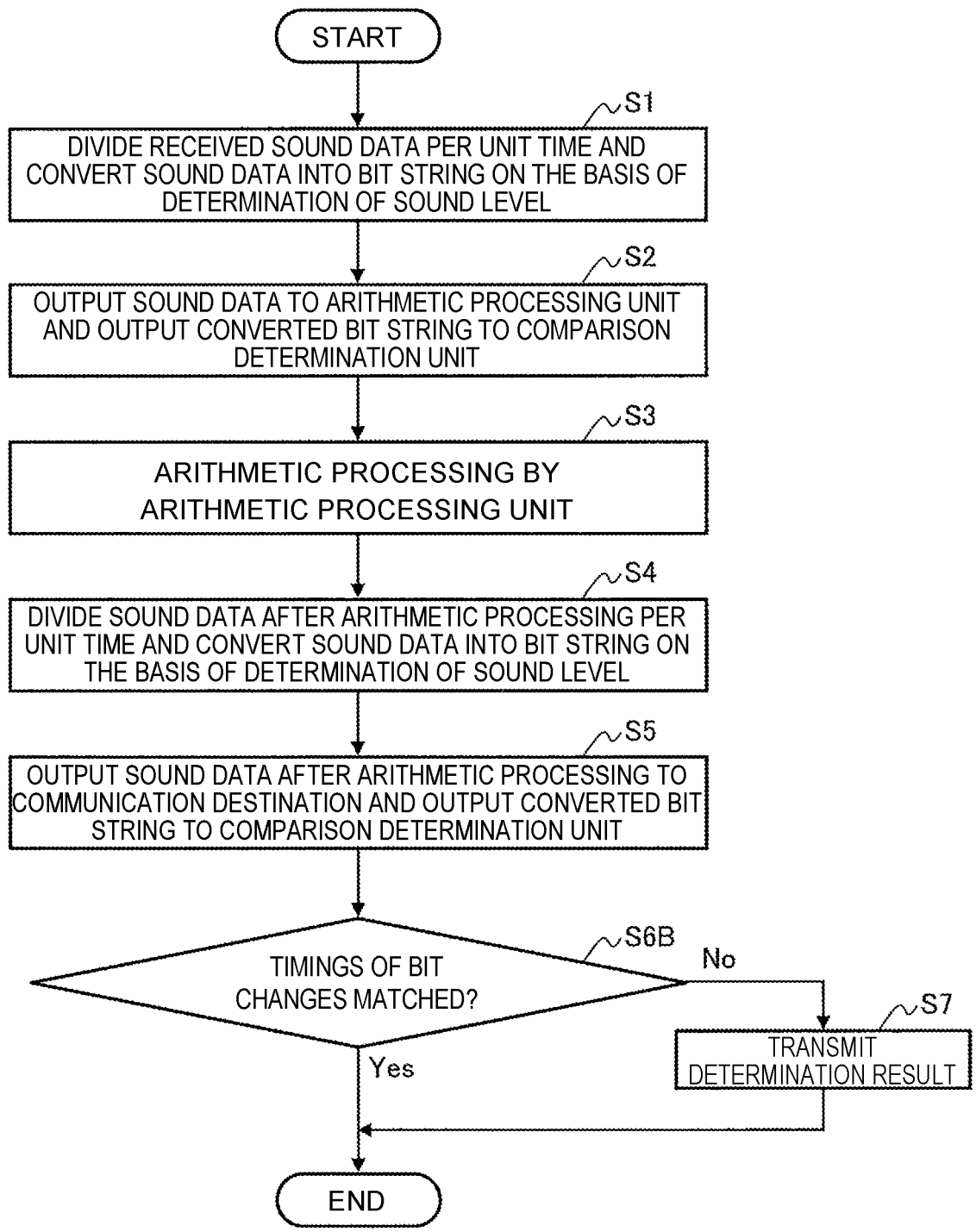
FIG. 6 is a flowchart showing a flow of sound failure detection processing carried out by the communication transmission device according to the second embodiment of the present invention.

FIG. 6 is a flowchart showing a flow of the sound failure detection processing carried out by the communication transmission device 1 (1B) according to the second embodiment of the present invention.

It should be noted that for the same processing as that in the communication transmission device 1 (1A) according to the first embodiment shown in FIG. 3, the same step number is given and the explanation thereof is omitted in FIG. 6. Specifically, the descriptions of steps S1 to S5 will be omitted.

In step S6B, the comparison determination unit 13B compares the bit string 101 acquired from the input sound level detection unit 11 in step S2 and the bit string 101*a* acquired from the output sound level detection unit 12 in step S5, and determines the sound failure according to whether the timings of the bit changes before and after the arithmetic processing are matched.

Then, when the timings of the bit changes are matched (Yes in step S6B), the comparison determination unit 13B determines that the sound failure has not occurred and ends the processing. On the other hand, when the timings of the bit changes are not matched (No in step S6B), the comparison determination unit 13B determines that the sound failure has occurred. Then, the comparison determination unit 13B transmits the determination result to this effect to a maintenance terminal (management server) or the like (step S7) and ends the processing.

According to the communication transmission device 1 (1A, 1B) related to the present embodiments described above, in sound communication such as a conversation in which a sound level changes as time passes by, it is made possible to appropriately determine a sound failure even when there is a change in the sound signals (sound data) before and after arithmetic processing such as codec conversion processing, echo cancel processing, or the like.

Further, in the communication transmission device 1 (1A, 1B), it is possible to maintain the quality of service by continuously monitoring an occurrence of the sound failure with a terminal for maintenance and notifying a maintenance terminal (management server) or the like when the failure occurs.

Furthermore, in the communication transmission device 1 (1A, 1B), it is possible to detect an occurrence of a failure without processing the sound data itself to be transmitted. Therefore, there is no risk of quality degradation caused by the processing of the sound data.

As a function of the communication transmission device 1 (1A, 1B) is to detect the sound failure by comparing the changes of the sound levels in the sound data before and after the arithmetic processing, in addition to a device that performs codec conversion processing, echo cancel processing, or the like, the function is also applicable to a device in which a difference in the sound data is produced before and after the arithmetic processing, such as a device that performs simple amplification.

<Hardware Configuration>

The communication transmission device 1 (1A, 1B) according to the present embodiments is implemented, for example, by a computer 900 configured as shown in FIG. 7.

FIG. 7 is a hardware configuration diagram showing an example of the computer 900 that implements the function of the communication transmission device 1 according to the present embodiments. The computer 900 has a CPU (Central Processing Unit) 901, a ROM (Read Only Memory) 902, a RAM (Random Access Memory) 903, an HDD (Hard Disk Drive) 904, an input and output I/F (Interface) 905, a communication I/F 906, and a media I/F 907.

The CPU 901 operates based on a program stored in the ROM 902 or the HDD 904, and performs control by each function unit of FIGS. 1 and 4. The ROM 902 stores a boot program executed by the CPU 901 at the start-up of the computer 900, a program related to hardware of the computer 900, and the like.

The CPU 901 controls an input device 910 such as a mouse and a keyboard and an output device 911 such as a display and a printer through the input and output I/F 905. The CPU 901 acquires data from the input device 910 and outputs generated data to the output device 911 through the input and output I/F 905.

The HDD 904 stores a program executed by the CPU 901 and data or the like used by the program. The communication I/F 906 receives data from unillustrated other devices (for example, maintenance terminals, and the like) through a communication network (for example, a network 920) and outputs the data to the CPU 901. The communication I/F 906 also transmits the data generated by the CPU 901 to other devices through the communication network.

The media I/F 907 reads a program or data stored in a recording medium 912 and outputs the program or the data to the CPU 901 through the RAM 903. The CPU 901 loads a program related to target processing from the recording medium 912 on the RAM 903 through the media I/F 907, and executes the loaded program. The recording medium 912 is an optical recording medium such as a DVD (Digital Versatile Disc), a PD (Phase change rewritable Disk), or the like, a magneto-optic recording medium such as an MO (Magneto Optical disk), a magneto recording medium, a conductor memory tape medium, a semiconductor memory, or the like.

For example, when the computer 900 functions as the communication transmission device 1 according to the present embodiments, the CPU 901 of the computer 900 implements the function of the communication transmission device 1 by executing the loaded program on the RAM 903. Further, data in the RAM 903 is stored in the HDD 904. The CPU 901 executes the program related to the target processing after reading the program from the recording medium 912. In addition, the CPU 901 may read a program related to target processing from another device through the communication network (the network 920).

<Effects>

Hereinafter, effects of the communication transmission device according to the present invention will be described.

The communication transmission device according to the present invention is the communication transmission device 1 (1A, 1B) for transmitting sound data, which includes the input sound level detection unit 11 for dividing, per unit time, the input sound data 100 of a predetermined period of time and converting the sound data 100 into the bit string 101 represented by a bit value of 0 or 1 according to whether or not a sound level of the sound data per the unit time exceeds a predetermined threshold value, the arithmetic processing unit 10 for performing predetermined arithmetic processing on the sound data 100, the output sound level detection unit 12 for dividing, per the unit time, the sound data 100a of the predetermined period of time after the arithmetic processing, which is output by the arithmetic processing unit 10, and converting the sound data 100a into the bit string 101a represented by a bit value of 0 or 1 according to whether or not a sound level of the sound data per the unit time exceeds the predetermined threshold value, and the comparison determination unit 13 for determining whether or not a sound failure has occurred on the basis of a predetermined logic by which the bit string 101 before the arithmetic processing, which has been converted by the input sound level detection unit 11, and the bit string 101a after the arithmetic processing, which has been converted by the output sound level detection unit 12, are compared.

As described above, according to the communication transmission device 1 (1A, 1B), it is made possible to appropriately determine a sound failure even when predetermined arithmetic processing, for example, codec conversion processing, echo cancel processing, or the like has caused a change in the sound data (sound signals) before and after the arithmetic processing.

Further, in the communication transmission device 1 (1A, 1B), a comparison is made before and after the arithmetic processing not by processing the sound data itself to be transmitted but by converting the sound levels indicated by the sound data into the bit strings. Therefore, a sound failure can be determined without causing degradation of quality due to the processing of the sound data.

Further, in the communication transmission device 1 (1A), the predetermined logic is a logic by which the bit string 101 before the arithmetic processing and the bit string 101a after the arithmetic processing are compared to determine that a sound failure has occurred when change patterns of the respective bit values of the bit strings are not matched and to determine that a sound failure has not occurred when the change patterns of the respective bit values of the bit strings are matched.

Thus, the communication transmission device 1 (1A) can determine that a sound failure has occurred due to, for example, switching over between channels, a noise, or the like when the change patters of the respective bit values are not matched in the bit strings before and after the arithmetic processing. Therefore, it is made possible to reliably detect an occurrence of the sound failure.

Further, in the communication transmission device 1 (1B), the predetermined logic is a logic by which the bit string 101 before the arithmetic processing and the bit string 101a after the arithmetic processing are compared to determine that a sound failure has occurred when timings of the bit changes of the bit values represented by 0 to 1 and 1 to 0 are not matched and to determine that a sound failure has not occurred when the timings thereof are matched.

Thus, the communication transmission device 1 (1B) can determine that a sound failure has occurred due to, for example, switching over between channels, a noise, or the like when the timings of the bit changes are not matched in the bit strings before and after the arithmetic processing. Therefore, it is made possible to reliably detect an occurrence of the sound failure.

It should be noted that the present invention is not limited to the embodiments described above, and many modifications can be made by a person who has common knowledge in the art within the technical idea of the present invention.

REFERENCE SIGNS LIST 1, 1A, 1B Communication transmission devices
10 Arithmetic processing unit
11 Input sound level detection unit
12 Output sound level detection unit
13, 13A, 13B Comparison determination units

The invention claimed is:

1. A communication transmission device for transmitting sound data, the communication transmission device comprising:
   a processor; and
   a memory device storing instructions that, when executed by the processor, configure the processor to:
   divide, per unit time, input sound data of a predetermined period of time and to convert the sound data into a bit string represented by a bit value of 0 or 1 according to whether or not a sound level of the sound data per the unit time exceeds a predetermined threshold value;
   perform predetermined arithmetic processing on the sound data;
   divide, per the unit time, the sound data of the predetermined period of time after the arithmetic processing and convert the sound data into a bit string represented by a bit value of 0 or 1 according to whether or not a sound level of the sound data per the unit time exceeds the predetermined threshold value; and
   determine whether or not a sound failure has occurred on the basis of a predetermined logic by which the bit string before the arithmetic processing, which has been converted, and the bit string after the arithmetic processing, which has been converted, are compared.

2. The communication transmission device according to claim 1, wherein the predetermined logic is a logic by which the bit string before the arithmetic processing and the bit string after the arithmetic processing are compared to determine that a sound failure has occurred when change patterns of respective bit values of the bit strings are not matched and to determine that a sound failure has not occurred when the change patterns of the respective bit values of the bit strings are matched.

3. The communication transmission device according to claim 1, wherein the predetermined logic is a logic by which the bit string before the arithmetic processing and the bit string after the arithmetic processing are compared to determine that a sound failure has occurred when timings of the bit changes of the bit values represented by 0 to 1 and 1 to 0 are not matched and to determine that a sound failure has not occurred when the timings thereof are matched.

4. A sound failure detection method for transmitting sound data, comprising:
    dividing, per unit time, input sound data of a predetermined period of time and converting the sound data into a bit string represented by a bit value of 0 or 1 according to whether or not a sound level of the sound data per the unit time exceeds a predetermined threshold value;
    performing predetermined arithmetic processing on the sound data;
    dividing, per the unit time, the sound data of the predetermined period of time after the arithmetic processing and converting the sound data into a bit string represented by a bit value of 0 or 1 according to whether a sound level of the sound data per the unit time exceeds the predetermined threshold value; and
    determining whether or not a sound failure has occurred on the basis of a predetermined logic by which the bit string converted before the arithmetic processing and the bit string converted after the arithmetic processing are compared.

5. A non-transitory computer readable medium causing a computer to operate as the communication transmission device according to claim 1.

6. A non-transitory computer readable medium causing a computer to operate as the communication transmission device according to claim 2.

7. A non-transitory computer readable medium causing a computer to operate as the communication transmission device according to claim 3.

* * * * *